United States Patent [19]

McManus

[11] Patent Number: 5,113,616
[45] Date of Patent: May 19, 1992

[54] FISH LINE TO HOOK SHANK SNAP ON AND RELEASE CONNECTOR

[76] Inventor: Phillip W. McManus, 1701 Hardy Rd., Grand Prairie, Tex. 75051

[21] Appl. No.: 551,014

[22] Filed: Jul. 11, 1990

[51] Int. Cl.⁵ .............................................. A01K 91/04
[52] U.S. Cl. .................. 43/44.83; 43/43.16; 43/42.08; 43/42.49
[58] Field of Search ............... 43/42.49, 44.83, 43.16, 43/42.23, 42.08, 42.52, 43.1

[56] References Cited

U.S. PATENT DOCUMENTS

| 62,042 | 2/1867 | Lee | 43/43.16 X |
| 196,648 | 10/1877 | Edgar | 43/43.16 |
| 835,766 | 10/1906 | Strehlow | 43/42.52 |
| 2,826,855 | 3/1958 | Troccia | 43/44.83 |
| 4,361,977 | 12/1982 | Lawler | 43/44.83 |

*Primary Examiner*—Richard K. Seidel
*Assistant Examiner*—Patty E. Hong
*Attorney, Agent, or Firm*—Warren H. Kintzinger

[57] ABSTRACT

An easy connect and disconnect two piece fishhook structure is provided with the hook portion having a stem shank with an annular cold formed or machined depression adjacent its free end. The other portion of the two piece fishhook structure is a spring connect member with two opposite side extensions from a coil spring loop that also serves as the fish line tie on loop. One of the two opposite side extensions is a mounting spring reaction force anchor end with a tightly coiled end that is an open sliding fit on the hook shank. The other extension is a spring arm from the coil spring loop with an end hook stem engaging hook "V" that is resiliently deflected inwardly to permit passage of the hook stem therethrough and resilient coil spring force engagement against the annular depression in the stem shank when so positioned with release by the hand. When hook portion release is desired from the connected state the two opposite side extensions are squeezed toward each other against the resilient resistive force of the coil spring loop for quick release of the hook portion.

10 Claims, 1 Drawing Sheet

FISH LINE TO HOOK SHANK SNAP ON AND RELEASE CONNECTOR

BACKGROUND OF THE INVENTION

This invention relates in general to fishhooks, and more particularly, to an easy connect and disconnect fishhook with a fish line to hook shank spring snap on and release connector.

Many fish when landed by a fisherman using fishing gear with a line and hook are quite active flipping and flopping around making it quite difficult to remove the barbed fishhook from the mouth of the fish at that time. The fisherman is subject to being bitten by some fish and/or sometimes getting hurt by the barbed hook with the difficulties encountered in removing the hook from the fish-'s mouth. If the fisherman has to wait until the fish has stopped moving to remove the fishhook he may have to wait an undesired length of time or cut the line to fasten it to another hook. In this situation most fishermen do not like cutting the line but the more time he can have a baited hook in the water the more fish he is likely to catch. Another problem is that if a fishhook is not securely set in the fish's mouth with the various movements of the fish and reaction forces imposed on the hook it may break loose and the fish become lost.

SUMMARY OF THE INVENTION

It is therefore a principal object of this invention to provide an easy connect and disconnect connector for fishhooks that makes release of the connector and fish line from the hook easier, quicker and much safer than extracting a fishhook from the mouth of a still active fish.

Another object is to eliminate having to cut a fish line to free the fishing equipment from direct connection to a newly landed fish.

A further object is to provide a fishing hook system where extra hook sections can be pre-baited for hook shank snap on connection to a fish line hook connector.

Still another object with such a fishhook structure is to increase the time a fisherman is able to have baited hook and line in the water.

Features of the invention useful in accomplishing the above objects include, in a fish line to hook shank snap on and release connector system, an easy connect and disconnect two piece fishhook structure with the hook portion having a stem shank with an annular cold formed or machined depression adjacent its free end. The other portion of the two piece fishhook structure is a spring connect member with two opposite side extensions from a coil spring loop that also serves as the fish line tie on loop. One of the two opposite side extensions is a mounting spring reaction force anchor end with a tightly coiled end that is an open sliding fit on the hook shank. The other spring arm extension is an arm from the coil spring loop with an end hook "V" portion. The spring arm with the hook "V" is resiliently deflected inwardly to permit passage of the hook stem through the hook "V" and resilient coil spring force maintained engagement against the annular depression in the stem shank when so positioned with release by the hand. When hook portion release is desired from the connected state the two opposite side extensions are squeezed toward each other against the resilient resistive force of the coil spring loop for quick release of the hook portion.

Specific embodiments representing what are presently regarded as the best modes of carrying out the invention are illustrated in the accompanying drawing.

DESCRIPTION OF THE ILLUSTRATED EMBODIMENTS

Figure 1:
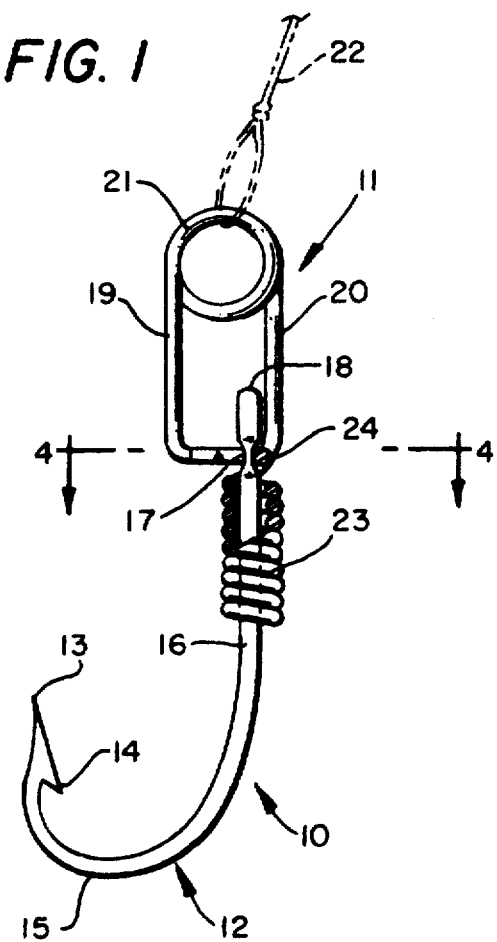
FIG. 1 represents an elevational view partially broken away of the easy connect and disconnect two piece fishhook structure.
Figure 2:
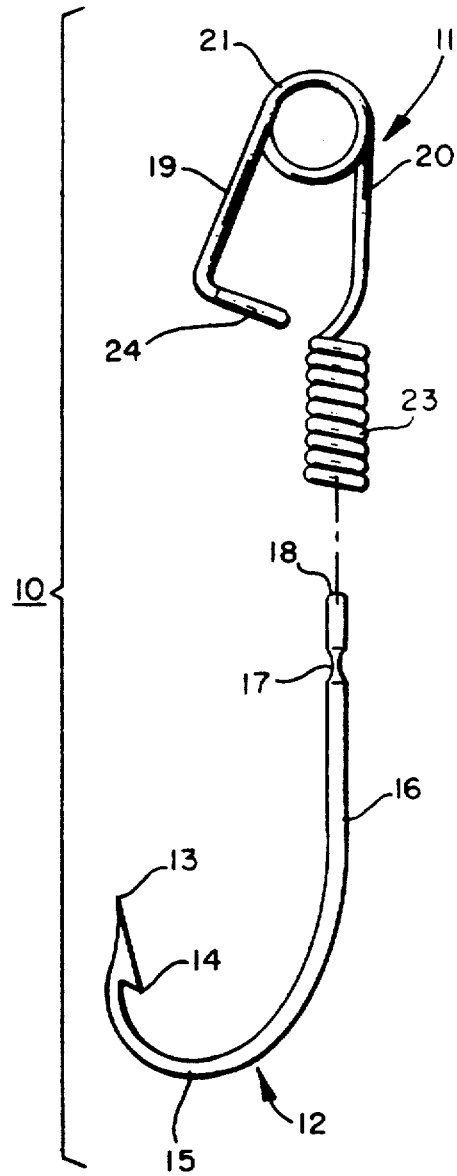
FIG. 2, an elevational view of the spring connect member and the barbed hook portion with a stem shank in the released separated state.

The easy connect and disconnect two piece fishhook 10 of FIGS. 1 and 2 is shown to include a spring connect member 11 and a hook portion 12 with a pointed end 13 with a barb 14 out of an intermediate portion 15 from stem shank 16 having an annular cold roll formed connector engaging depression 17 adjacent stem shank end 18. The spring connect member 11 has first and second sides 19 and 20 from a coil spring loop 21 that also serves as the fish line 22 tie on loop. Second side 20 serves as an anchoring leg with a tightly coiled end 23 that is a free sliding fit on the stem shank 16 of the hook portion 12. First side 19 is a spring leg from the coil spring loop 21 with an end stem engaging "V" or "U" shaped hook 24 that is resiliently deflected inwardly to permit passage of the hook stem 16 therethrough and resilient coil spring force backed engagement of the stem engaging hook 24 against the annular depression 17 in the stem shank 16 when so positioned with release by the hand. When hook portion 12 release is desired from the connected state the two opposite legs 19 and 20 of spring contact member 11 are squeezed toward each other against the resilient force of the coil spring loop 21 for quick release of the hook portion 12. It should be noted that hook portion 12 and the spring connect member 11 may rotate relative to each other and still maintain the connected state thereby lessening some reaction forces that may otherwise be imposed on the spring connect member as translated therefrom to and through the hook portion 12. This helps minimize breaking loose of a hook from its hold set state in the mouth of a fish in spite of various fish movements that otherwise could impose reaction forces on the hook that could break hook portion 12 loose resulting in loss of the fish.

Figure 3:
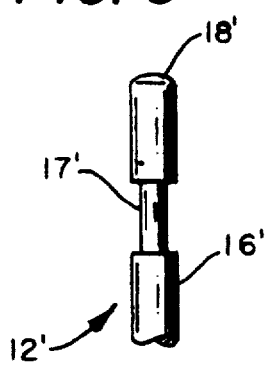
FIG. 3, an enlarged partial view of another hook stem shank embodiment with a machined annular depression in place of the annular cold formed hook stem shank connector engage depression of the embodiment of FIGS. 1 and 2.
Figure 4:
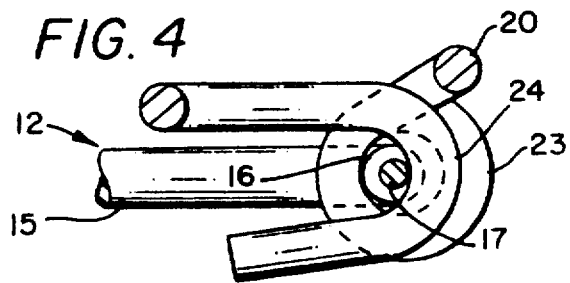
FIG. 4, an enlarged view taken from line 4—4 of FIG. 1 showing the spring arm hook "U" engaging the annular depression in the stem shank of the hook portion.

Referring now to the hook embodiment of FIG. 3, the annular groove 17' is a machined groove, in place of the annular cold roll formed connector engaging depression 17 of FIGS. 1 and 2 in the hook portion 12' shank 16'. Everything else in this embodiment is the same as with the embodiment of FIGS. 1 and 2 with connect and disconnect essentially the same end with relative rotation between the spring connect member 11 and the hook portion 12 the same.

Whereas this invention has been described with respect to two embodiments thereof, it should be realized that various changes may be made without departure from the essential contributions to the art made by the teachings hereof.

I claim:

1. A fish line to hook shank snap on and release connector comprising:
   an easy connect and disconnect two piece fishhook structure including;
   a hook portion having a stem shank and a curved hook section terminating in a pointed and barbed end,
   said stem shank being formed with an annular depression adjacent the free end of said stem shank,
   a spring biased connect member comprising a coil spring loop having;
   a first side forming a spring leg the end of which is formed into a resiliently deflectable stem engaging hook, and
   a second side forming an anchoring leg the end of which is formed into a coiled anchor for insertion of said stem shank,
   said annular depression held by said stem engaging hook with the force of said coil spring loop.

2. The fish line to hook shank snap on and release connector of claim 1, wherein said first and second side legs are squeezeable toward each other against the resilient resistive force of said intermediate coil spring loop for release of said hook portion.

3. The fish line to hook shank snap on and release connector of claim 1, wherein said coil spring loop is also the fish line tie on loop.

4. The fish line to hook shank snap on and release connector of claim 2, wherein said coiled anchor is extended on said second side beyond the length of said first side such that when said stem engaging hook is in resilient coil spring force biased engagement against said annular depression in said stem shank, said coiled anchor is positioned on said stem shank below said annular depression toward said curved hook section of said hook portion.

5. The fish line to hook shank snap on and release connector of claim 4, wherein the opposite ends of said annular depression which meet the diameter of said stem shank are outwardly sloped annular surfaces.

6. The fish line to hook shank snap on and release connector of claim 5, wherein said annular depression is an annular forged depression.

7. The fish line to hook shank snap on and release connector of claim 6, wherein said annular depression is an annular cold roll formed connector depression.

8. The fish line to hook shank snap on and release connector of claim 7, wherein said outwardly sloped surfaces are sufficiently steep to achieve a coefficient of friction lock against separation of said two piece fishhook structure.

9. The fish line to hook shank snap on and release connector of claim 4, wherein said annular depression is a machine cut depression in the stem shank of said hook portion.

10. The fish line to hook shank snap on and release connector of claim 9, wherein said annular depression is a cylindrical machine cut depression.

* * * * *